(12) United States Patent
Emerson et al.

(10) Patent No.: US 11,518,537 B2
(45) Date of Patent: Dec. 6, 2022

(54) CATALYTIC FUEL TANK INERTING SYSTEM

(71) Applicant: Hamilton Sundstrand Corporation, Charlotte, NC (US)

(72) Inventors: Sean C. Emerson, Broad Brook, CT (US); Zissis A. Dardas, Worcester, MA (US); Robert R. Hebert, Storrs, CT (US); Randolph Carlton McGee, Hamden, CT (US); Allen Murray, Bloomfield, CT (US); Eric Surawski, Glastonbury, CT (US); Joseph Turney, Amston, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1204 days.

(21) Appl. No.: 16/014,037

(22) Filed: Jun. 21, 2018

(65) Prior Publication Data
US 2019/0389593 A1    Dec. 26, 2019

(51) Int. Cl.
*B64D 37/32* (2006.01)
*B01D 53/26* (2006.01)
*B64D 37/02* (2006.01)
*F02C 7/22* (2006.01)
*B01D 53/86* (2006.01)
(Continued)

(52) U.S. Cl.
CPC .......... *B64D 37/32* (2013.01); *B01D 53/265* (2013.01); *B01D 53/86* (2013.01); *B01J 12/007* (2013.01); *B01J 19/14* (2013.01); *B64D 37/02* (2013.01); *F02C 7/22* (2013.01); *B01D 2255/10* (2013.01); *B01D 2256/10* (2013.01); *B01D 2256/22* (2013.01); *B01D 2257/104* (2013.01);
(Continued)

(58) Field of Classification Search
None
See application file for complete search history.

(56) References Cited

U.S. PATENT DOCUMENTS 3,847,298 A    11/1974    Hamilton
7,172,156 B1    2/2007    Jones
(Continued)

FOREIGN PATENT DOCUMENTS

CN    108033027 A    5/2018

OTHER PUBLICATIONS

Berty, J.M "Experiments in Catalytic Reaction Engineering", Studies in Surface Science and Catalysis, vol. 124, Elsevier, Amsterdam, 1999 (294 pages).
(Continued)

*Primary Examiner* — Jelitza M Perez
(74) *Attorney, Agent, or Firm* — Cantor Colburn LLP (57) ABSTRACT

Fuel tank inerting systems are provided. The systems include a fuel tank, an air source arranged to supply air into a reactive flow path, a catalytic reactor having a plurality of sub-reactors along the flow path, and a heat exchanger. The sub-reactors are arranged relative to the heat exchanger such that the flow path passes through at least a portion of the heat exchanger between two sub-reactors along the flow path. At least one fuel injector is arranged relative to at least one sub-reactor. The fuel injector is configured to inject fuel into the flow path at at least one of upstream of and in the respective at least one sub-reactor to generate a fuel-air mixture. A fuel tank ullage supply line fluidly connects the flow path to the fuel tank to supply an inert gas to a ullage of the fuel tank.

20 Claims, 6 Drawing Sheets

(51) Int. Cl.
 B01J 12/00 (2006.01)
 B01J 19/14 (2006.01)
(52) U.S. Cl.
 CPC .................. *B01D 2257/702* (2013.01); *B01J 2219/00103* (2013.01); *F05D 2220/323* (2013.01)

(56) References Cited

U.S. PATENT DOCUMENTS

| | | |
|---|---|---|
| 7,195,742 B2 | 3/2007 | Liu et al. |
| 7,694,916 B2 | 4/2010 | Limaye et al. |
| 7,896,292 B2 | 3/2011 | Limaye et al. |
| 8,287,762 B2 | 10/2012 | Repasky |
| 9,687,773 B2 | 6/2017 | Johnson et al. |
| 2004/0163826 A1 | 8/2004 | Spring |
| 2007/0292342 A1 | 12/2007 | Hemmings et al. |
| 2015/0283503 A1 | 10/2015 | Chambron et al. |
| 2018/0148188 A1 | 5/2018 | Surawski |
| 2018/0148191 A1 | 5/2018 | Smith et al. |
| 2018/0370648 A1 | 12/2018 | Rheaume et al. |

OTHER PUBLICATIONS

Levenspiel, O. "Chemical Reaction Engineering", John Wiley & Sons, New York, 1962, pp. 452-453.
European Search Report for European Application No. 19178860.3, International Filing Date Jun. 6, 2019, dated Nov. 29, 2019, 5 pages.

CATALYTIC FUEL TANK INERTING SYSTEM

BACKGROUND

The subject matter disclosed herein generally relates to fuel handling systems, and more particularly to fuel tank inerting systems such as used on aircraft.

It is recognized that fuel vapors within fuel tanks become combustible in the presence of oxygen. An inerting system decreases the probability of combustion of flammable materials stored in a fuel tank by maintaining a chemically non-reactive or inert gas, such as nitrogen-enriched air, in the fuel tank vapor space, also known as ullage. Three elements are required to initiate and sustain combustion: an ignition source (e.g., heat), fuel, and oxygen. Combustion may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of combustion by reducing the oxygen concentration by introducing an inert gas such as nitrogen-enriched air (NEA) to the ullage, thereby displacing oxygen with a mixture of nitrogen and oxygen at target thresholds for avoiding explosion or combustion.

It is known in the art to equip aircraft with onboard inert gas generating systems, which supply nitrogen-enriched air to the vapor space (i.e., ullage) within the fuel tank. The nitrogen-enriched air has a substantially reduced oxygen content that reduces or eliminates combustible conditions within the fuel tank. Onboard inert gas generating systems typically use membrane-based gas separators. Such separators contain a membrane that is permeable to oxygen and water molecules, but relatively impermeable to nitrogen molecules. A pressure differential across the membrane causes oxygen molecules from air on one side of the membrane to pass through the membrane, which forms oxygen-enriched air (OEA) on the low-pressure side of the membrane and NEA on the high-pressure side of the membrane. The requirement for a pressure differential necessitates a source of compressed or pressurized air.

Bleed air from an aircraft engine or from an onboard auxiliary power unit can provide a source of compressed air; however, this can reduce available engine power and also must compete with other onboard demands for compressed air, such as the onboard air environmental conditioning system and anti-ice systems. Moreover, certain flight conditions, such as during aircraft descent, can lead to an increased demand for NEA at precisely the time when engines could be throttled back for fuel savings so that maintaining sufficient compressed air pressure for meeting the pneumatic demands may come at a significant fuel burn cost. Additionally, there is a trend to reduce or eliminate bleed-air systems in aircraft. For example a no-bleed system architecture may utilize electrical systems to replace some or all of the pneumatic systems to improve fuel efficiency, as well as reduce weight and lifecycle costs.

Other aircraft architectures may adopt low-pressure bleed configurations where engine design parameters allow for a bleed flow of compressed air, but at pressures less than the 45 psi air (unless stated otherwise, "psi" as used herein means absolute pressure in pounds per square inch, i.e., psia) that has been typically provided to conventional onboard environmental control systems. One or more separate compressors can be used to provide pressurized air to a membrane gas separator, but this may undesirably increase aircraft payload, and also represents another onboard device with moving parts that is subject to maintenance issues or device failure.

BRIEF DESCRIPTION

According to some embodiments, fuel tank inerting systems are provided. The fuel tank inerting systems include a fuel tank, an air source arranged to supply air into a reactive flow path, a catalytic reactor comprising a plurality of sub-reactors arranged along the reactive flow path, a heat exchanger, wherein the plurality of sub-reactors are arranged relative to the heat exchanger such that the reactive flow path passes through at least a portion of the heat exchanger between two of the plurality of sub-reactors along the reactive flow path, at least one fuel injector arranged relative to at least one sub-reactor of the plurality of sub-reactors, the at least one fuel injector configured to inject fuel into the reactive flow path at at least one of upstream of and in the respective at least one sub-reactor to generate a fuel-air mixture, and a fuel tank ullage supply line fluidly connecting the reactive flow path to the fuel tank to supply an inert gas to a ullage of the fuel tank.

In addition to one or more of the features described above, or as an alternative, further embodiments of the fuel tank inerting systems may include that the at least one fuel injector comprises a plurality of fuel injectors arranged along the reactive flow path.

In addition to one or more of the features described above, or as an alternative, further embodiments of the fuel tank inerting systems may include that the at least one fuel injector is a passive flow control to meter injection of the fuel into the reactive flow path.

In addition to one or more of the features described above, or as an alternative, further embodiments of the fuel tank inerting systems may include that the at least one fuel injector is a valve and wherein a fluid pressure of the fuel determines a fuel injection rate.

In addition to one or more of the features described above, or as an alternative, further embodiments of the fuel tank inerting systems may include that the at least one fuel injector is an active flow control to meter injection of the fuel into the reactive flow path, wherein a controller controls operation of the at least one fuel injector.

In addition to one or more of the features described above, or as an alternative, further embodiments of the fuel tank inerting systems may include that the at least one fuel injector is at least one of electrically controlled, electronically controlled, and mechanically controlled.

In addition to one or more of the features described above, or as an alternative, further embodiments of the fuel tank inerting systems may include a supplemental fuel line fluidly connecting the fuel tank to the at least one fuel injector.

In addition to one or more of the features described above, or as an alternative, further embodiments of the fuel tank inerting systems may include that the number of fuel injectors is equal to the number of sub-reactors.

In addition to one or more of the features described above, or as an alternative, further embodiments of the fuel tank inerting systems may include that as the heat exchanger comprises a plurality of cells, wherein each cell of the heat exchanger is positioned between two sub-reactors with the reactive flow path passing through the cells to cool the fuel-air mixture.

In addition to one or more of the features described above, or as an alternative, further embodiments of the fuel tank inerting systems may include that the plurality of sub-reactors comprises at least four sub-reactors.

In addition to one or more of the features described above, or as an alternative, further embodiments of the fuel tank inerting systems may include that the plurality of sub-reactors comprises at least six sub-reactors.

In addition to one or more of the features described above, or as an alternative, further embodiments of the fuel tank inerting systems may include that the fuel tank is a fuel tank of an aircraft, and a cooling air within the heat exchanger is sourced from a ram inlet of the aircraft.

According to some embodiments, aircraft are provided. The aircraft include a fuel tank, an air source arranged to supply air into a reactive flow path, a catalytic reactor comprising a plurality of sub-reactors arranged along the reactive flow path, a heat exchanger, wherein the plurality of sub-reactors are arranged relative to the heat exchanger such that the reactive flow path passes through at least a portion of the heat exchanger between two of the plurality of sub-reactors along the reactive flow path, at least one fuel injector arranged relative to at least one sub-reactor of the plurality of sub-reactors, the at least one fuel injector configured to inject fuel into the reactive flow path at at least one of upstream of and in the respective at least one sub-reactor to generate a fuel-air mixture, and a fuel tank ullage supply line fluidly connecting the reactive flow path to the fuel tank to supply an inert gas to a ullage of the fuel tank.

In addition to one or more of the features described above, or as an alternative, further embodiments of the aircraft may include that the at least one fuel injector comprises a plurality of fuel injectors arranged along the reactive flow path.

In addition to one or more of the features described above, or as an alternative, further embodiments of the aircraft may include that the at least one fuel injector is a passive flow control to meter injection of the fuel into the reactive flow path.

In addition to one or more of the features described above, or as an alternative, further embodiments of the aircraft may include that the at least one fuel injector is an active flow control to meter injection of the fuel into the reactive flow path, wherein a controller controls operation of the at least one fuel injector.

In addition to one or more of the features described above, or as an alternative, further embodiments of the aircraft may include a supplemental fuel line fluidly connecting the fuel tank to the at least one fuel injector.

In addition to one or more of the features described above, or as an alternative, further embodiments of the aircraft may include that as the heat exchanger comprises a plurality of cells, wherein each cell of the heat exchanger is positioned between two sub-reactors with the reactive flow path passing through the cells to cool the fuel-air mixture.

In addition to one or more of the features described above, or as an alternative, further embodiments of the aircraft may include that the plurality of sub-reactors comprises at least four sub-reactors.

In addition to one or more of the features described above, or as an alternative, further embodiments of the aircraft may include that the plurality of sub-reactors comprises at least six sub-reactors.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
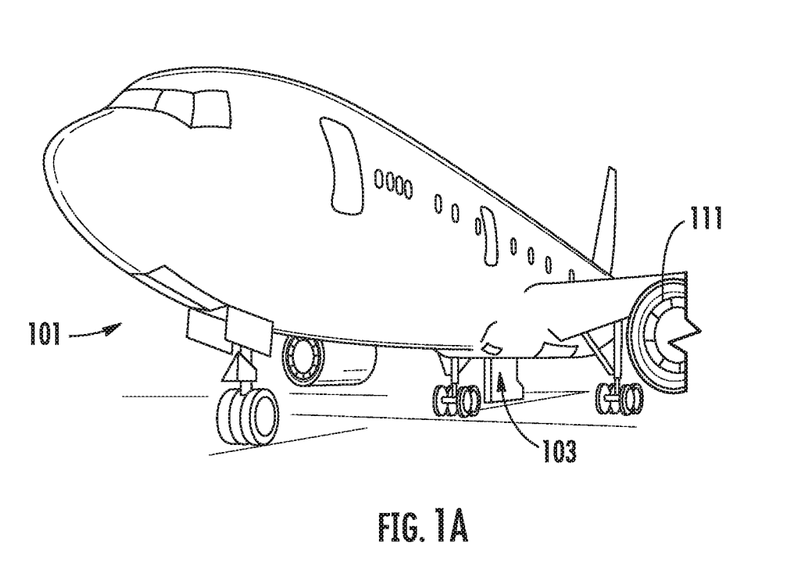
FIG. 1A is a schematic illustration of an aircraft that can incorporate various embodiments of the present disclosure.
Figure 1B:
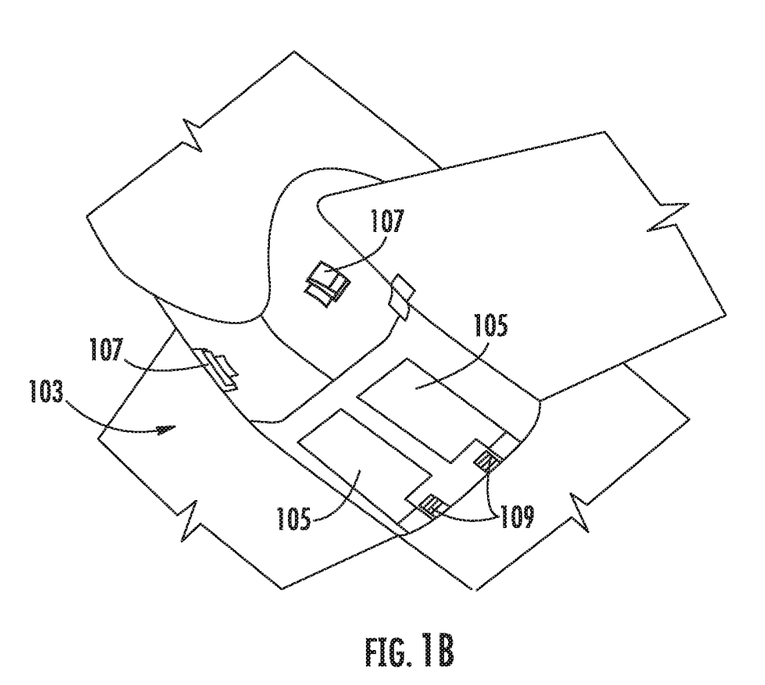
FIG. 1B is a schematic illustration of a bay section of the aircraft of FIG. 1A.

As shown in FIGS. 1A-1B, an aircraft 101 can include one or more bays 103 beneath a center wing box. The bay 103 can contain and/or support one or more components of the aircraft 101. For example, in some configurations, the aircraft 101 can include environmental control systems and/or fuel inerting systems within the bay 103. As shown in FIG. 1B, the bay 103 includes bay doors 105 that enable installation and access to one or more components (e.g., environmental control systems, fuel inerting systems, etc.). During operation of environmental control systems and/or fuel inerting systems of the aircraft 101, air that is external to the aircraft 101 can flow into one or more environmental control systems within the bay doors 105 through one or more ram air inlets 107. The air may then flow through the environmental control systems to be processed and supplied to various components or locations within the aircraft 101 (e.g., passenger cabin, fuel inerting systems, etc.). Some air may be exhaust through one or more ram air exhaust outlets 109.

Also shown in FIG. 1A, the aircraft 101 includes one or more engines 111. The engines 111 are typically mounted on wings of the aircraft 101, but may be located at other locations depending on the specific aircraft configuration. In some aircraft configurations, air can be bled from the engines 111 and supplied to environmental control systems and/or fuel inerting systems, as will be appreciated by those of skill in the art.

As noted above, typical air separation modules operate using pressure differentials to achieve desired air separation. Such systems require a high pressure pneumatic source to drive the separation process across the membrane. Further, the hollow fiber membrane separators commonly used are relatively large in size and weight, which is a significant consideration with respect to aircraft (e.g., reductions in volume and weight of components can improve flight efficiencies). Embodiments provided herein provide reduced volume and/or weight characteristics of inert-gas or low-oxygen supply systems for aircraft. Further, embodiments provided herein can prevent humid air from entering fuel tanks of the aircraft, thus preventing various problems that may arise with some fuel system components. In accordance with some embodiments of the present disclosure, the typical hollow fiber membrane separator is replaced by a catalytic system (e.g., $CO_2$ generation system), which can be, for example, smaller, lighter, and/or more efficient than the typical fiber membrane separators. That is, in accordance with embodiments of the present disclosure, the use of hollow fiber membrane separators may be eliminated.

A function of fuel tank flammability reduction systems in accordance with embodiments of the present disclosure is accomplished by reacting a small amount of fuel vapor (e.g., a "first reactant") with a source of gas containing oxygen (e.g., a "second reactant"). The product of the reaction is carbon dioxide and water vapor. The source of the second reactant (e.g., air) can be bleed air or any other source of air containing oxygen, including, but not limited to, high-pressure sources (e.g., engine), bleed air, cabin air, etc. A catalyst material is used to induce a chemical reaction, including, but not limited to, precious metal materials. The carbon dioxide that results from the reaction is an inert gas that is mixed with nitrogen naturally found in fresh/ambient air, and is directed back within a fuel tank to create an inert environment within the fuel tank, thus reducing the flammability of the vapors in the fuel tank. Further, in some embodiments, the fuel tank flammability reduction or inerting systems of the present disclosure can provide a functionality such that water vapor from the atmosphere does not enter the fuel tanks during descent stages of flight of an aircraft. This can be accomplished by controlling a flow rate of inert gas into the fuel tank so that a positive pressure is continuously maintained in the fuel tank.

In accordance with embodiments of the present disclosure, a catalyst is used to induce a chemical reaction between oxygen ($O_2$) and fuel vapor to produce carbon dioxide ($CO_2$) and water vapor. The source of $O_2$ used in the reaction can come from any of a number of sources, including, but not limited to, pneumatic sources on an aircraft that supply air at a pressure greater than ambient pressure. The fuel vapor is created by draining a small amount of fuel from an aircraft fuel tank into an evaporator container. The fuel can be heated to vaporize the fuel, such as by using an electric heater, as shown and described in some embodiments of the present disclosure. The fuel vapor is removed from the evaporator container, in some embodiments, by an ejector which can induce a suction pressure that pulls the fuel vapor out of the evaporator container. Such ejectors can utilize elevated pressures of a second reactant source containing $O_2$ (e.g., a pneumatic source) to induce a secondary flow of the ejector which is sourced from the evaporator container. As such, the ejector can be used to mix the extracted fuel vapor with the $O_2$ from a second reactant source.

The mixed air stream (fuel vapor and oxygen or air) is then introduced to a catalyst, which induces a chemical reaction that transforms the $O_2$ and fuel vapor into $CO_2$ and water vapor. Any inert gas species that are present in the mixed stream (for example, nitrogen), will not react and will thus pass through the catalyst unchanged. In some embodiments, the catalyst is in a form factor that acts as a heat exchanger. For example, in one non-limiting configuration, a plate fin heat exchanger configuration is employed wherein a hot side of the heat exchanger would be coated with catalyst material. In such arrangement, the cold side of the catalyst heat exchanger can be fed with a cool air source, such as ram air or some other source of cold air. The air through the cold side of the heat exchanger can be controlled such that the temperature of a hot, mixed-gas stream is hot enough to sustain a desired chemical reaction within or at the catalyst. Further, the cooling air can be used to maintain a cool enough temperature to enable removal of heat generated by exothermic reactions at the catalyst.

As noted above, the catalytic chemical reaction generates water vapor. Having water (in any form) enter the primary fuel tank can be undesirable. Thus, in accordance with embodiments of the present disclosure, the water from a product gas stream (e.g., exiting the catalyst) can be removed through various mechanisms, including, but not limited to, condensation. The product gas stream can be directed to enter a heat exchanger downstream from the catalyst that is used to cool the product gas stream such that the water vapor condenses and drops out of the product gas stream. The liquid water can then be drained overboard. In some embodiments, an optional water separator can be used to augment or provide water separation from the product stream.

In some embodiments, a flow control valve meters a flow of an inert gas (with water vapor removed therefrom) to a predetermined and/or controlled inert gas flow rate. Further, in some embodiments, an optional fan can be used to boost the inert gas stream pressure to overcome a pressure drop associated with ducting and flow lines between the catalyst and a fuel tank into which the inert gas is supplied. In some embodiments, a flame arrestor can be arranged at an inlet to the fuel tank (where the inert gas enters) to prevent any potential flames from propagating into the fuel tank.

Independent of any aircraft flammability reduction systems, aircraft fuel tanks are typically vented to ambient air. At altitude, pressure inside the fuel tank is very low and is roughly equal to ambient pressure. However, during descent, the pressure inside the fuel tank needs to rise to equal ambient pressure at sea level (or at whatever altitude the aircraft is landing). The change in pressures requires gas entering the tank from outside to equalize the pressure. When air from outside enters the tank, water vapor is normally present with it. Water can become trapped in the fuel tank and cause problems. In accordance with embodiments of the present disclosure, to prevent water from entering the fuel tanks, the fuel inerting systems of the present disclosure can repressurize the fuel tanks with dry inert gas that is generated as described above and below. The repressurization can be accomplished by using a flow control valve to control the flow of inert gas into the fuel tank such that a positive pressure is constantly maintained in the fuel tank. The positive pressure within the fuel tank can prevent air from entering the fuel tank from outside during descent and therefore prevent water from entering the fuel tank.

Figure 2:
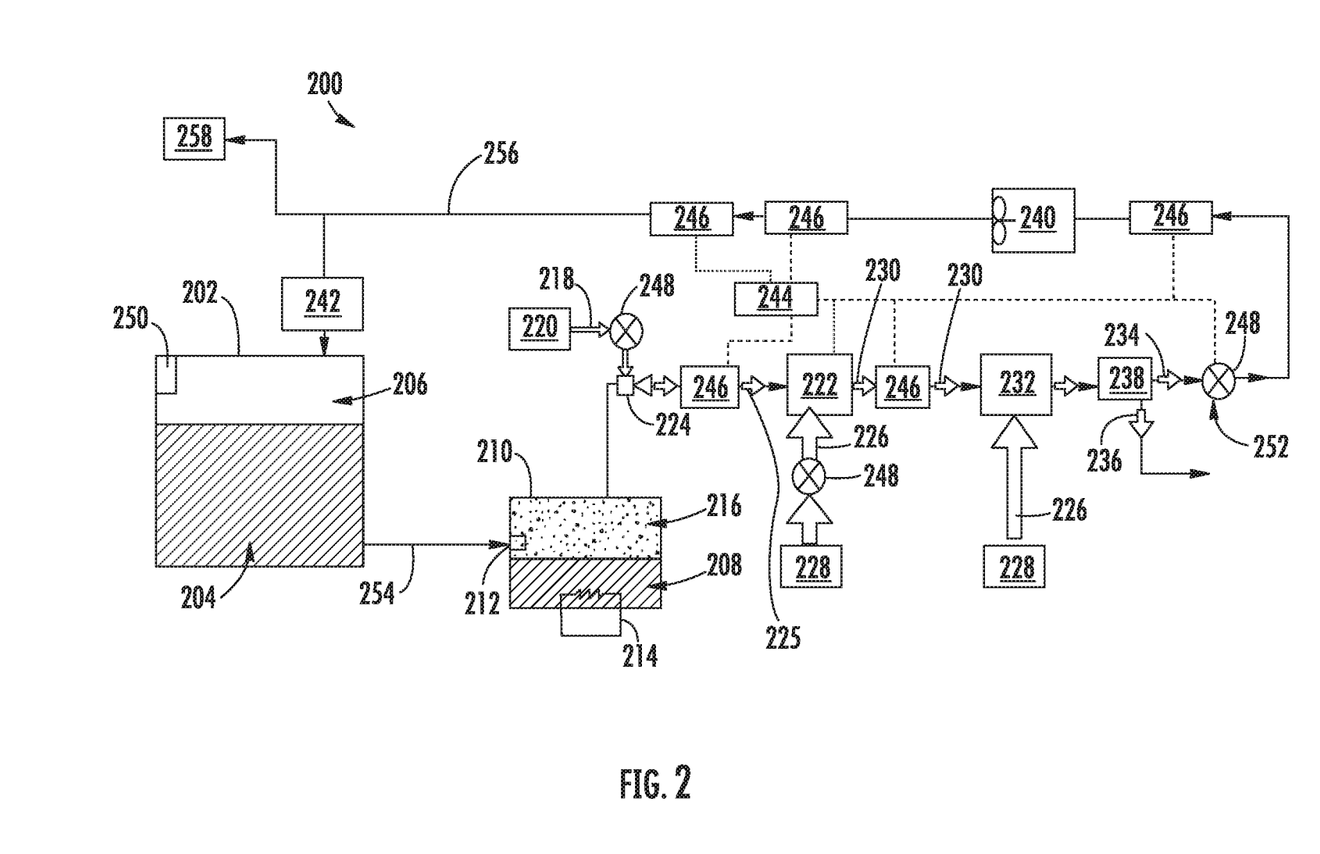
FIG. 2 is a schematic illustration of an example embodiment of a fuel tank inerting system.

FIG. 2 is a schematic illustration of a flammability reduction or inerting system 200 utilizing a catalytic reaction to produce inert gas in accordance with an embodiment of the present disclosure. The inerting system 200, as shown, includes a fuel tank 202 having fuel 204 therein. As the fuel 204 is consumed during operation of one or more engines, an ullage space 206 forms within the fuel tank 202. To reduce flammability risks associated with vaporized fuel that may form within the ullage space 206, an inert gas can be generated and fed into the ullage space 206.

In accordance with embodiments of the present disclosure, an inerting fuel 208 can be extracted from the fuel tank 202 and into an evaporator container 210. The amount of fuel 204 that is extracted into the evaporator container 210 (i.e., the amount of inerting fuel 208) can be controlled by an evaporator container valve 212, such as a float valve. The inerting fuel 208, which may be in liquid form when pulled from the fuel tank 202, can be vaporized within the evaporator container 210 using a heater 214, such as an electric heater, to generate a first reactant 216. The first reactant 216 is a vaporized portion of the inerting fuel 208 located within the evaporator container 210. The first reactant 216 is mixed with a second reactant 218 which is sourced from a second reactant source 220. The second reactant 218 is air containing oxygen that is catalyzed with the first reactant 216 to generate an inert gas to be supplied into the ullage space 206 of the fuel tank 202. The second reactant 218 can come from any source on an aircraft that is at a pressure greater than ambient pressure, including, but not limited to bleed air from an engine, cabin air, etc. (i.e., any second reactant source 220 can take any number of configurations and/or arrangements). The first reactant 216 within the evaporator container 210 and the second reactant 218 can be directed into a catalytic reactor 222 by and/or through a mixer 224, which, in some embodiments, may be an ejector or jet pump. The mixer 224 will mix the first and second reactants 216, 218 into a mixed air stream 225.

The catalyst of the catalytic reactor 222 can be temperature controlled to ensure a desired chemical reaction efficiency such that an inert gas can be efficiently produced by the inerting system 200 from the mixed air stream 225. Accordingly, cooling air 226 can be provided to extract heat from the catalytic reactor 222 to achieve a desired thermal condition for the chemical reaction within the catalytic reactor 222. The cooling air 226 can be sourced from a cool air source 228. A catalyzed mixture 230 leaves the catalytic reactor 222 and is passed through a heat exchanger 232. The heat exchanger 232 operates as a condenser on the catalyzed mixture 230 to separate out an inert gas 234 and a byproduct 236. A cooling air is supplied into the heat exchanger 232 to achieve the condensing functionality. In some embodiments, as shown, a cooling air 226 can be sourced from the same cool air source 228 as that provided to the catalytic reactor 222, although in other embodiments the cool air sources for the two components may be different. The byproduct 236 may be liquid water or water vapor, and thus in the present configuration shown in FIG. 2, a water separator 238 is provided downstream of the heat exchanger 232 to extract the liquid water or water vapor from the catalyzed mixture 230, thus leaving only the inert gas 234 to be provided to the ullage space 206 of the fuel tank 202.

The inerting system 200 can include additional components including, but not limited to, a fan 240, a flame arrestor 242, and a controller 244. Various other components can be included without departing from the scope of the present disclosure. Further, in some embodiments, certain of the included components may be optional and/or eliminated. For example, in some arrangements, the fan 240 and/or the water separator 238 can be omitted. The controller 244 can be in operable communication with one or more sensors 246 and valves 248 to enable control of the inerting system 200.

In one non-limiting example, flammability reduction is achieved by the inerting system 200 by utilizing the catalytic reactor 222 to induce a chemical reaction between oxygen (second reactant 218) and fuel vapor (first reactant 216) to produce carbon dioxide (inert gas 234) and water in the vapor phase (byproduct 236). The source of the second reactant 218 (e.g., oxygen) used in the reaction can come from any source on the aircraft that is at a pressure greater than ambient pressure. The fuel vapor (first reactant 216) is created by draining a small amount of fuel 204 from the fuel tank 202 (e.g., a primary aircraft fuel tank) into the evaporator container 210. The inerting fuel 208 within the evaporator container 210 is heated using the electric heater 214. In some embodiments, the first reactant 216 (e.g., fuel vapor) is removed from the evaporator container 210 by using the mixer 224 to induce a suction pressure that pulls the first reactant 216 out of the evaporator container 210. The mixer 224, in such embodiments, utilizes the elevated pressure of the second reactant source 220 to induce a secondary flow within the mixer 224 which is sourced from the evaporator container 210. Further, as noted above, the mixer 224 is used to mix the two gas streams (first and second reactants 216, 218) together to form the mixed air stream 225.

The mixed air stream 225 (e.g., fuel vapor and oxygen or air) is then introduced to the catalytic reactor 222, inducing a chemical reaction that transforms the mixed air stream 225 (e.g., fuel and air) into the inert gas 234 and the byproduct 236 (e.g., carbon dioxide and water vapor). It is noted that any inert gas species that are present in the mixed air stream 225 (for example, nitrogen) will not react and will thus pass through the catalytic reactor 222 unchanged. In some embodiments, the catalytic reactor 222 is in a form factor that acts as a heat exchanger. For example, one non-limiting configuration may be a plate fin heat exchanger wherein the hot side of the heat exchanger would be coated with the catalyst material. Those of skill in the art will appreciate that various types and/or configurations of heat exchangers may be employed without departing from the scope of the present disclosure. The cold side of the catalyst heat exchanger can be fed with the cooling air 226 from the cool air source 228 (e.g., ram air or some other source of cold air). The air through the cold side of the catalyst heat exchanger can be controlled such that the temperature of the hot mixed gas stream 225 is hot enough to sustain the chemical reaction desired within the catalytic reactor 222, but cool enough to remove the heat generated by the exothermic reaction, thus maintaining aircraft safety and materials from exceeding maximum temperature limits.

As noted above, the chemical reaction process within the catalytic reactor 222 can produce byproducts, including water in vapor form. It may be undesirable to have water (in any form) enter the fuel tank 202. Accordingly, water byproduct 236 can be removed from the product gas stream (i.e., inert gas 234) through condensation. To achieve this, catalyzed mixture 230 enters the heat exchanger 232 that is used to cool the catalyzed mixture 230 such that the byproduct 236 can be removed (e.g., a majority of the water vapor condenses and drops out of the catalyzed mixture 230). The byproduct 236 (e.g., liquid water) can then be drained overboard. An optional water separator 238 can be used to accomplish this function.

A flow control valve 248 located downstream of the heat exchanger 232 and optional water separator 238 can meter the flow of the inert gas 234 to a desired flow rate. An optional boost fan 240 can be used to boost the gas stream pressure of the inert gas 234 to overcome a pressure drop associated with ducting between the outlet of the heat exchanger 232 and the discharge of the inert gas 234 into the fuel tank 202. The flame arrestor 242 at an inlet to the fuel tank 202 is arranged to prevent any potential flames from propagating into the fuel tank 202.

Typically, independent of any aircraft flammability reduction system(s), aircraft fuel tanks (e.g., fuel tank 202) need to be vented to ambient pressure. Thus, as shown in FIG. 2, the fuel tank 202 includes a vent 250. At altitude, pressure inside the fuel tank 202 is very low and is roughly equal to ambient pressure. During descent, however, the pressure inside the fuel tank 202 needs to rise to equal ambient pressure at sea level (or whatever altitude the aircraft is landing at). This requires gas entering the fuel tank 202 from outside to equalize the pressure. When air from outside enters the fuel tank 202, water vapor can be carried by the ambient air into the fuel tank 202. To prevent water/water vapor from entering the fuel tank 202, the inerting system 200 can repressurize the fuel tank 202 with the inert gas 234 generated by the inerting system 200. This is accomplished by using the valves 248. For example, one of the valves 248 may be a flow control valve 252 that is arranged fluidly downstream from the catalytic reactor 222. The flow control valve 252 can be used to control the flow of inert gas 234 into the fuel tank 202 such that a slightly positive pressure is always maintained in the fuel tank 202. Such positive pressure can prevent ambient air from entering the fuel tank 202 from outside during descent and therefore prevent water from entering the fuel tank 202.

As noted above, the controller 244 can be operably connected to the various components of the inerting system 200, including, but not limited to, the valves 248 and the sensors 246. The controller 244 can be configured to receive input from the sensors 246 to control the valves 248 and thus maintain appropriate levels of inert gas 234 within the ullage space 206. Further, the controller 244 can be arranged to ensure an appropriate amount of pressure within the fuel tank 202 such that, during a descent of an aircraft, ambient air does not enter the ullage space 206 of the fuel tank 202.

In some embodiments, the inerting system 200 can supply inert gas to multiple fuel tanks on an aircraft. As shown in the embodiment of FIG. 2, an inerting supply line 254 fluidly connects the fuel tank 202 to the evaporator container 210. After the inert gas 234 is generated, the inert gas 234 will flow through a fuel tank supply line 256 to supply the inert gas 234 to the fuel tank 202 and, optionally, additional fuel tanks 258.

The inerting system 200 or other inerting systems as provided here, may be employed on aircraft and/or employed for other applications where inert gas may be required, such as oil tankers. To prevent combustion and explosions, the ullage of fuel tanks and containers is filled with inert air containing, for example, less than 12% oxygen. Inert gas generation by catalytic oxidation, as provided herein, generates a significant amount of heat, which must be managed to prevent damage to the oxidizer system and to minimize any hazard to an aircraft or other application. One solution to this is to provide for a staged or gradient-based injection of air within the oxidizer.

As provided herein, inerting systems are arranged with a staged fuel injection, and inter-stage cooling. That is, embodiments provided herein are directed to staged or sectioned catalytic reactors. By managing the temperature within the catalytic oxidizer, potential damage to the catalyst can be alleviated. Lower operating temperatures can also impact the choice of materials of construction for the oxidizer. In addition, lower temperatures may reduce the risk of operating an oxidizer near fuel, particularly if the system can operate below an autoignition temperature of the fuel. Advantageously, staged fuel injection as described herein can allow the whole system to operate below the lower flammability limit concentration of the fuel, ensuring that only the catalyst can cause the oxidation to proceed.

Embodiments provided herein are directed to a catalytic reactor and heat exchanger arrangement that allows for staged fuel injection with respect to a catalyst. Between separate injections and/or catalytic reactions, a cooling stage may be present to provide temperature control of a fuel-air mixture that is catalyzed within the catalytic reactor.

Figure 3:
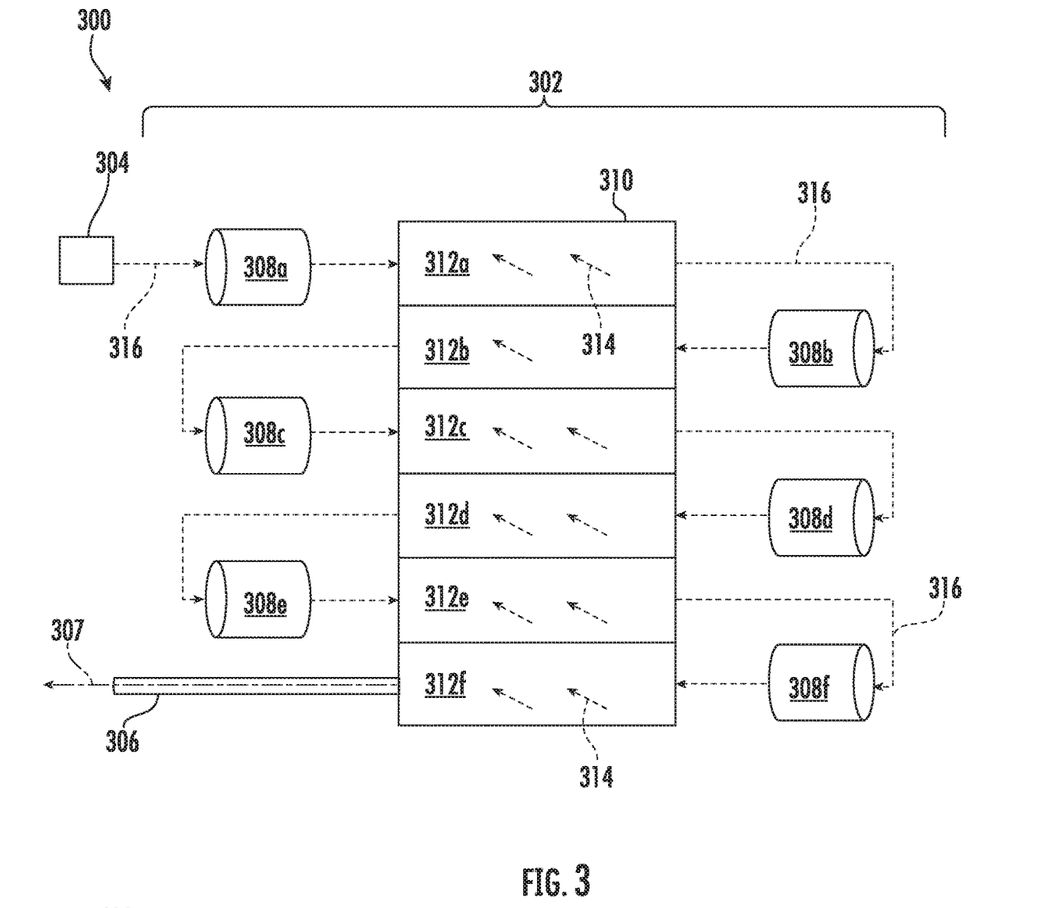
FIG. 3 is a schematic illustration of a fuel tank inerting system in accordance with an embodiment of the present disclosure.

For example, turning now to FIG. 3, a schematic illustration of an inerting system 300 is shown. The inerting system 300 may be similar to that shown and described above, with various components omitted (e.g., upstream and downstream of a catalytic reactor 302) for simplicity and clarity. As shown, the catalytic reactor 302 is located downstream of a primary injector 304. Downstream of the catalytic reactor 302 may be various components, such as that described above, with a fuel tank ullage supply line 306 arranged to supply an inert gas 307 to a fuel tank.

In this illustrative embodiment, the catalytic reactor 302 is arranged with multiple sub-reactors 308a-f arranged about a heat exchanger 310, with the heat exchanger having multiple heat exchanger cells 312a-f. The heat exchanger 310 receives a cooling air 314 which flows into and through the cells 312a-f. As shown, the cells 312a-f are illustratively discrete or separate boxes, thus illustrating separate or discrete cells. However, such arrangement is not to be limiting, and the cells 312a-f may merely represent different areas or regions of the heat exchanger 310, as described herein. In this illustration, the cooling air 314 flows into the page, and in some embodiments, the cooling air 314 contacts or interacts with each cell 312a-f at the same time, and thus at substantially the same temperature and pressure (e.g., the cells 312a-f are arranged in parallel with respect to the flow of the cooling air 314). However, in other embodiments, the cells 312a-f may be arranged such that the flow of the cooling air 314 interacts with each cell or group of cells having different temperature and/or pressure (e.g., staggered cells that are arranged in series along a flow direction of the cooling air 314). In one non-limiting embodiment, the cooling air 314 may be ram air as supplied by a ram inlet of an aircraft.

In operation, a fuel-air mixture passes through a reactive flow path 316 is supplied into the catalytic reactor 302 from the primary injector 304. The primary injector 304 is arranged to inject the fuel-air mixture into the catalytic reactor 302 through the reactive flow path 316. The primary injector 304 may be any type of injection or supply mechanism, as will be appreciated by those of skill in the art. For example, the primary injector may be a pump system, a valve system, an ejector, etc. The fuel-air mixture may be generated upstream of the primary injector 304 or within the primary injector 304, depending on the configuration of the primary injector 304, and flows into the reactive flow path 316. The primary injector 304 supplies the fuel-air mixture into the catalytic reactor 302 having desired properties, such as flow rate, pressure, initial temperature, etc.

In this embodiment, the catalytic reactor 302 is separated into a series of sub-reactors 308a-f, which are separated to allow for an efficient, and potentially optimized, reaction and generation of inert gas. The sub-reactors 308a-f are each arranged to enable a catalytic reaction therein, thus altering the composition of the fuel-air mixture, such as reducing an oxygen content to sufficient levels to generate the inert gas 307 for supply into a fuel tank.

For example, as shown, the fuel-air mixture, in this illustrative embodiment, is passed through the reactive flow path 316 and into a first sub-reactor 308a. In the first sub-reactor 308a, the fuel-air mixture will interact with the catalyst of the first sub-reactor 308a to alter or change the composition of the fuel-air mixture. As the reaction occurs within the first sub-reactor 308a, the temperature of the fuel-air mixture (and the first sub-reactor 308a) will increase such that the temperature of the fuel-air mixture has a higher temperature at a downstream end of the first sub-reactor 308a than at the upstream end of the first sub-reactor 308a. Once leaving the first sub-reactor 308a, the fuel-air mixture continues through the reactive flow path 316 and is passed through the first cell 312a of the heat exchanger 310. Within the first cell 312a, the fuel-air mixture is cooled through thermal interaction with the cooling air 314. In some embodiments, the reactive flow path 316 passes through the first cell 312a within a fluid line or other passage that fluidly separates the fuel-air mixture from the cooling air 314.

After the cooled fuel-air mixture leaves the first cell 312a, the reduced temperature (and reduced oxygen content) fuel-air mixture flows into a second sub-reactor 308b. In the second sub-reactor 308b, the fuel-air mixture will interact with the catalyst of the second sub-reactor 308b to alter or change the composition of the fuel-air mixture further. As the reaction occurs within the second sub-reactor 308b, the temperature of the fuel-air mixture (and the second sub-reactor 308b) will increase such that the temperature of the fuel-air mixture has a higher temperature at a downstream end of the second sub-reactor 308b than at the upstream end of the second sub-reactor 308b. Once leaving the second sub-reactor 308b, the fuel-air mixture is passed through the second cell 312b of the heat exchanger 310. Within the second cell 312b, the fuel-air mixture is again cooled through thermal interaction with the cooling air 314. In some embodiments, the fuel-air mixture may pass through the second cell 312b within a fluid line or other passage that fluidly separates the fuel-air mixture from the cooling air 314. Thus, the oxygen content of the fuel-air mixture may be further reduced.

After the cooled fuel-air mixture leaves the second cell 312b, the reduced temperature (and reduced oxygen content) fuel-air mixture flows into a third sub-reactor 308c. In the third sub-reactor 308c, the fuel-air mixture will interact with the catalyst of the second sub-reactor 308c to alter or change the composition of the fuel-air mixture 31 further. As the reaction occurs within the third sub-reactor 308c, the temperature of the fuel-air mixture (and the third sub-reactor 308c) will increase such that the temperature of the fuel-air mixture has a higher temperature at a downstream end of the third sub-reactor 308c than at the upstream end of the third sub-reactor 308c. Once leaving the third sub-reactor 308c, the fuel-air mixture is passed through the third cell 312c of the heat exchanger 310. Within the third cell 312c, the fuel-air mixture is again cooled through thermal interaction with the cooling air 314. In some embodiments, the fuel-air mixture may pass through the third cell 312c within a fluid line or other passage that fluidly separates the fuel-air mixture from the cooling air 314. Thus, the oxygen content of the fuel-air mixture may be further reduced.

The above process may proceed through a number of additional sub-reactors 308d, 308e, 308f, with intermediate cooling within additional cells 312d, 312e, 312f of the heat exchanger 310. At each subsequent sub-reactor, the oxygen content of the fuel-air mixture may be reduced such that when the air that leaves the last cell (e.g., sixth cell 3120 of the heat exchanger, the inert gas 307 is formed. In some embodiments, additional treatment of the fuel-air mixture may occur prior to forming or generating the inert gas 307, such as moisture removal, heating or cooling, etc., as will be appreciated by those of skill in the art.

Although described above as a single fuel-air mixture supplied from the primary injector, in some embodiments, additional fuel may be injected into the fuel-air mixture such that a desired fuel content is maintained, ensuring desired reactions within each of the sub-reactors. For example, in some embodiments, each sub-reactor, or some subset of the group of sub-reactors, may include one or more fuel injectors that are arranged to inject fuel into the fuel-air mixture after a prior reaction has taken place.

Figure 4:
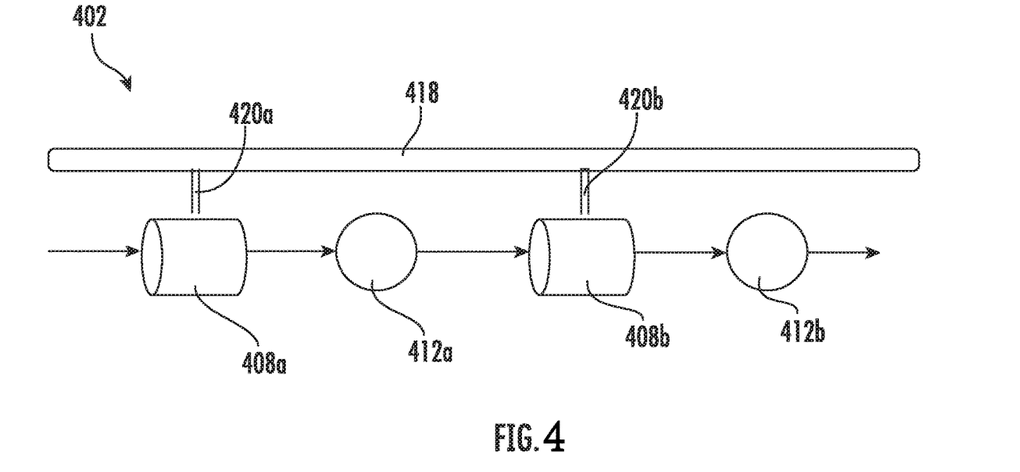
FIG. 4 is a schematic illustration of a portion of a fuel tank inerting system in accordance with an embodiment of the present disclosure.

For example, turning now to FIG. 4, a schematic illustration of a portion of a catalytic reactor 402 in accordance with an embodiment of the present disclosure is shown. The catalytic reactor 402 may be similar to that shown and described above, having a first sub-reactor 408a and a second sub-reactor 408b along a reactive flow path. Further, the sub-reactors 408a, 408b are arranged relative to a heat exchanger having a first cell 412a and a second cell 412b, similar to that shown and described above, such that the reactive flow path passes through the first and second cells 412a, 412b. In this embodiment, a supplemental fuel line 418 is arranged to supply additional fuel into a fuel-air mixture that is reacted within the sub-reactors 408a, 408b and cooled within the cells 412a, 412b of the heat exchanger.

As shown, a first fuel injector 420a fluidly connects the supplemental fuel line 418 to the first sub-reactor 408a and is arranged to inject fuel into the fuel-air mixture at the second sub-reactor 408a. Similarly, a second fuel injector 420b fluidly connects the supplemental fuel line 418 to the second sub-reactor 408b and is arranged to inject fuel into the fuel-air mixture at the second sub-reactor 408b. The fuel injectors 420a, 420b may be valves, ejectors, actively controlled injectors, passive valves or ports, or may take any other configuration to inject fuel from the supplemental fuel line 418 into the fluid stream of the fuel-air mixture. As such, a desired air-to-fuel ratio (A/F) of the fuel-air mixture may be achieved. In some embodiments, the fuel-air mixture may be maintained at a substantially constant air-to-fuel ratio (A/F) for the fluid within each sub-reactor of the catalytic reactor. However, in other embodiments, the air-to-fuel ratio (A/F) may be adjusted or changed for each sub-reactor, based on, for example, a desired reaction efficiency and/or composition of inert gas to be supplied to a fuel tank.

Figure 5:
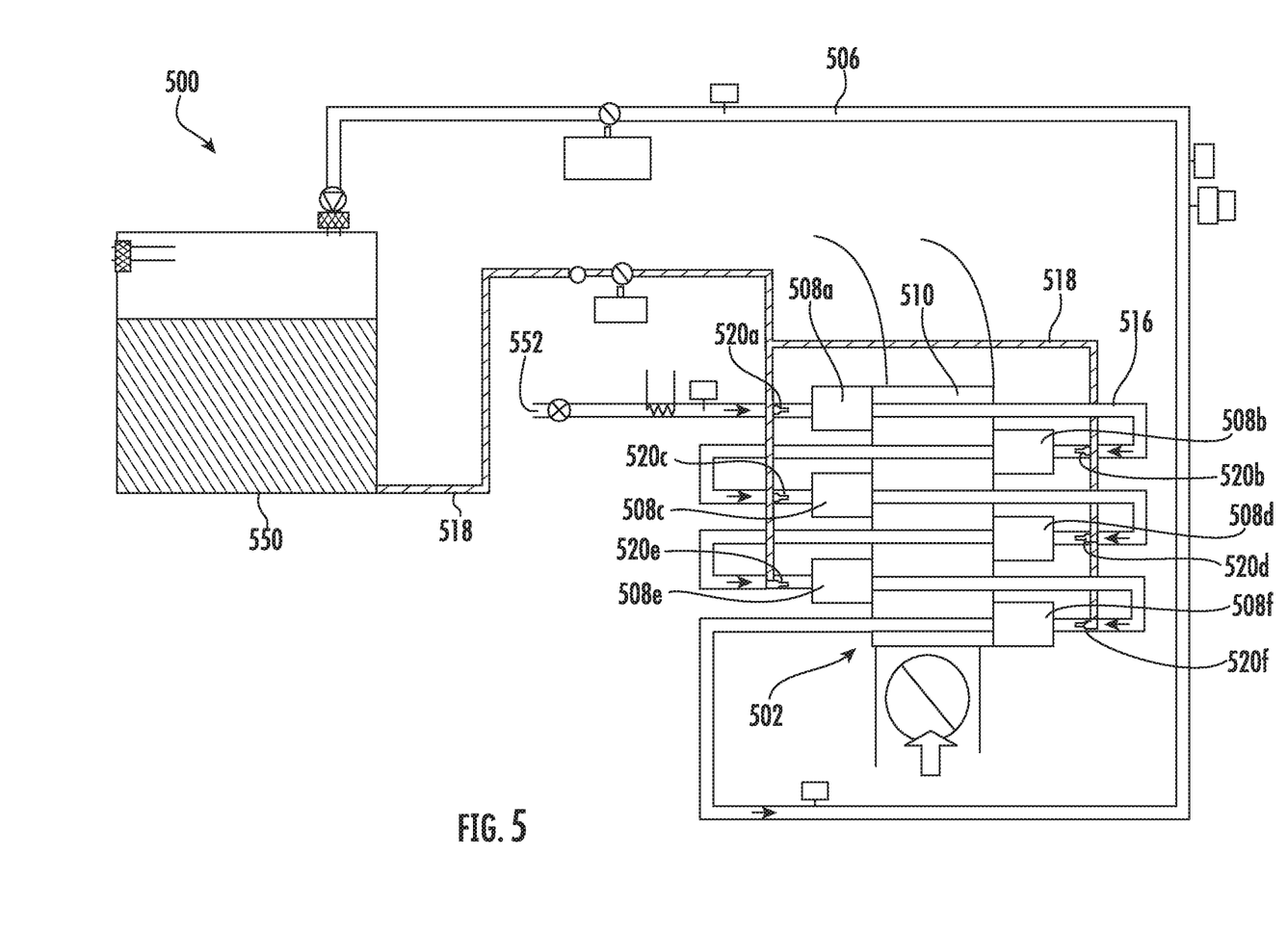
FIG. 5 is a schematic illustration of a fuel tank inerting system in accordance with an embodiment of the present disclosure.

Turning now to FIG. 5, a schematic illustration of an inerting system 500 in accordance with an embodiment of the present disclosure is shown. The inerting system 500 is arranged to supply an inert gas to a fuel tank 550, with fuel extracted from the fuel tank 550 to aid in generation of the inert gas. As shown, the inerting system 500 includes a catalytic reactor 502 including a plurality of sub-reactors 508a-f arranged about a heat exchanger 510. The inerting system 500 includes various illustrated, but not described, components, with such omission provided for simplicity and ease of understanding. However, those of skill in the art will appreciate that additional components may be included without departing from the scope of the present disclosure.

As shown, an air source 552 is arranged to supply air into the inerting system 500 through a reactive flow path 516, e.g., upstream of the catalytic reactor 502 to supply air to be reacted within the catalytic reactor 502. The air from the air source 552 is mixed with fuel to generate a fuel-air mixture at a first fuel injector 520a. The fuel-air mixture flows within the reactive flow path 516 into a first sub-reactor 508a for reaction, as described above. The heated fuel-air mixture is then passed through a portion of the heat exchanger 510 (e.g., through a cell and along the reactive flow path) and cooled. The cooled fuel-air mixture can then be injected with additional fuel at a second fuel injector 520b prior to entering a second sub-reactor 520b. The process may be repeated, with reacted fuel-air mixture being cooled within the heat exchanger 510 and then injected with additional fuel by one or more additional fuel injectors 520c-f and reacted within one or more additional sub-reactors 508c-f. After being reacted within the last sub-reactor of the series, the fuel-air mixture may have been altered sufficiently or converted into an inert gas for supply into the fuel tank 550 through a fuel tank ullage supply line 506.

As shown, a supplemental fuel line 518 is arranged to extract a portion of fuel from the fuel tank 550 and provide the extracted fuel to the fuel injectors 520a-f. One or more valves and/or controllers can be arranged along and/or within the supplemental fuel line 518 to provide metered injections of fuel into the fuel-air mixture throughout the reaction processes within the catalytic reactor 502. The fuel injectors 520a-f may be active or passive injectors. For example, in some embodiments, the fuel injectors 520a-f may be electronically, electrically, and/or mechanically controlled by a control system to supply a specific amount of fuel into the fuel-air mixture. In other embodiments, the fuel injectors 520a-f may be passive elements, such as valves, tapered orifices, or other structures that permit an amount of fuel to pass through the element to be injected into the fuel-air mixture. In some such embodiments, the flow rate and amount of fuel that is injected into the fuel-air mixture may be controlled by a fluid pressure within the supplemental fuel line 518.

Advantageously, by managing the temperature within the catalytic reactor and the sub-reactors thereof (e.g., catalytic oxidizers), potential damage to the catalyst can be alleviated. The lower temperatures achieved through a staged or series of sub-reactors can reduce the risk of operating any given sub-reactor near a fuel (i.e., prevent combustion of fuel), particularly if the system operates below the autoignition temperature of the fuel. Staged fuel injection as provided herein can allow the whole system to operate below the lower flammability limit concentration of the fuel, ensuring that only the catalyst can cause the oxidation to proceed.

Figure 6:
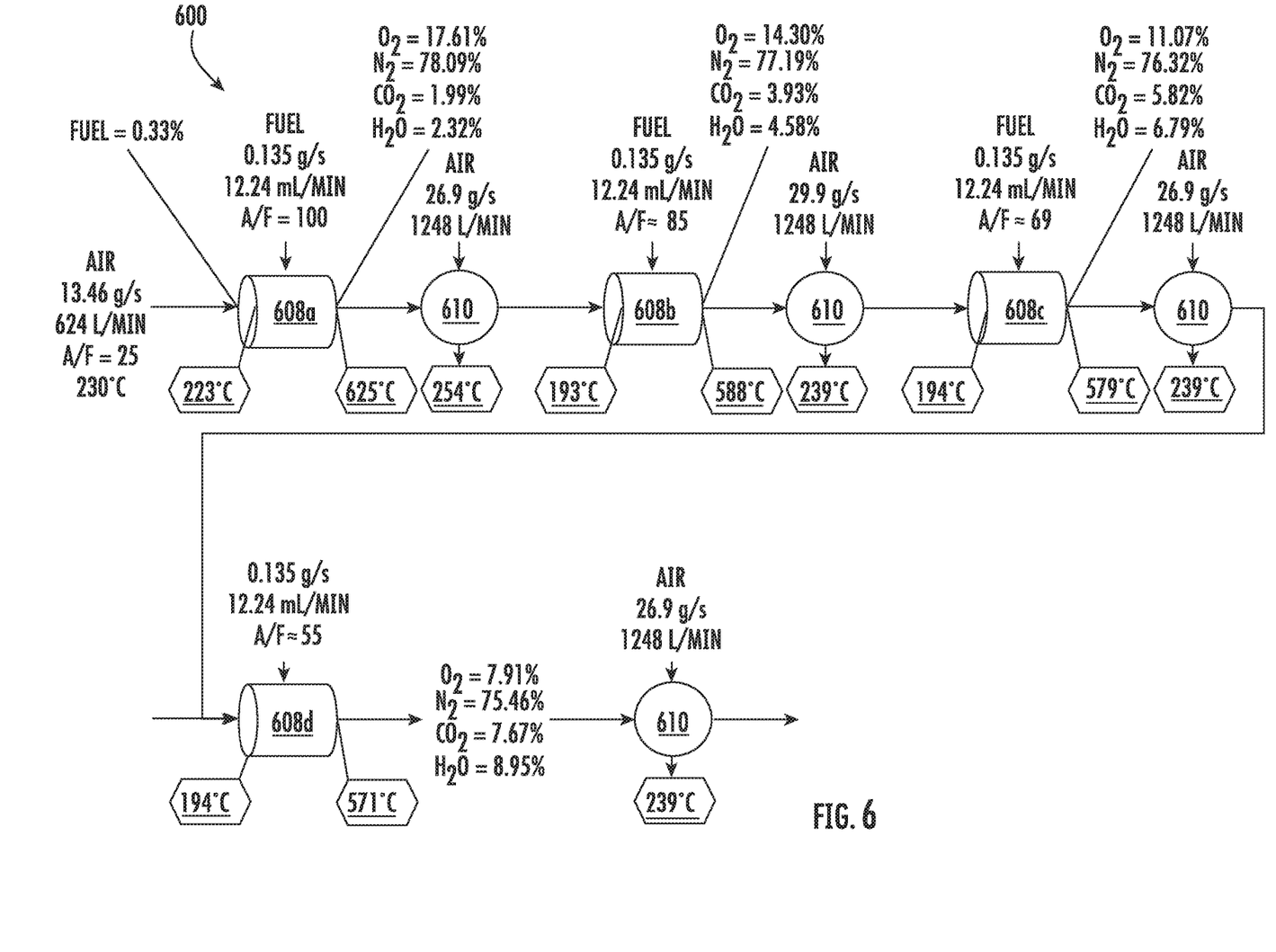
FIG. 6 is a schematic flow diagram of operation of a fuel tank inerting system in accordance with an embodiment of the present disclosure.
Figure 7:
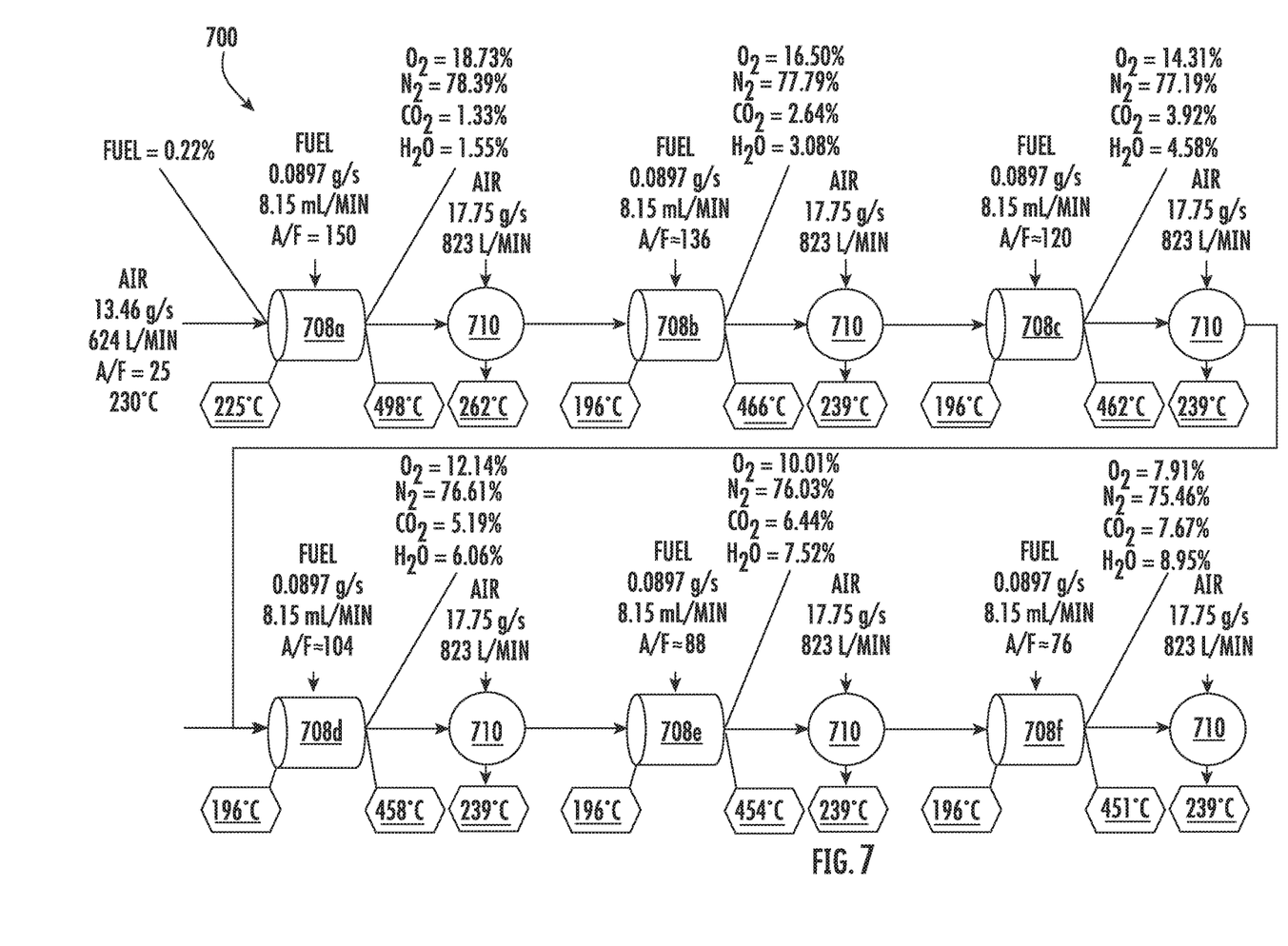
FIG. 7 is a schematic flow diagram of operation of a fuel tank inerting system in accordance with an embodiment of the present disclosure.

Turning now to FIGS. 6-7, schematic flow diagrams of an example inerting system 600 and an example inerting system 700 in accordance with embodiments of the present disclosure are shown. The inerting system 600 is a system having four sub-reactors 608a-d and the inerting system 700 is a system having six sub-reactors 708a-f. In both systems 600 and 700 a fuel-air mixture will leave each of the sub-reactors 608a-d and 708a-f and flow into and/or through a respective heat exchanger 610 and 710 (or cells thereof) to be cooled prior to entering the next sub-reactor 608a-d and 708a-f. The systems that form the inerting systems 600 and 700 may be similar to embodiments shown and described above.

In these systems, an amount of fuel is injected into the fuel-air mixture at (or just upstream) of each sub-reactor 608a-d and 708a-f. As the fuel is injected into the fuel-air mixture an air-to-fuel ratio (A/F) may be adjusted or changed for each sub-reactor, as shown in the flow diagrams. As shown in both systems, as the fuel-air mixture progresses through the systems 600 and 700, the air-to-fuel ratio (A/F) decreases.

For example, as shown in FIG. 6, the air-to-fuel ratio (A/F) prior to entering the first sub-reactor 608a may be about 100, with fuel being about 0.33% of the mixture. However, as the operation progresses, as shown, each time fuel is introduced into the fuel-air mixture, the effective air-to-fuel ratio (A/F) decreases (e.g., 85, 69, and 55). Further, as shown, during such progression within the inerting system 600 shown in FIG. 6, the $CO_2$ and $H_2O$ contents increase at the end of each catalytic reaction. In the inerting system 600 (see FIG. 6), after the reactions within the first sub-reactor 608a are performed, the fuel-air mixture has an $O_2$ content of about 17.6%, however, after the fuel-air mixture has completed the passage through the sub-reactors 608a-608d of the inerting system 600, the fuel-air mixture has an $O_2$ content of about 7.9%, which is below the flammability limit, and thus can be used as an inert gas in a fuel tank. It is noted that the water content may be removed by downstream elements, such as a water separator, prior to being supplied into a fuel tank.

The fluid temperatures of the fuel-air mixture and the cooling air (passing through the heat exchanger 610) are also illustratively shown in FIG. 6. As shown, as the fuel-air mixture passes through the first sub-reactor 608a and a catalytic reaction occurs, the temperature of the fuel-air mixture (and the first sub-reactor 608a) increases from about 223° C. to about 625° C. The heated fuel-air mixture then passes through the heat exchanger 610 which contains cooling air having a temperature of about 25° C. This cooling air can cool the fuel-air mixture down to about 193° C., as shown at the inlet to the second sub-reactor 608b, where additional fuel is injected and a second round of catalytic reactions are performed. The cooling air correspondingly increased in air temperature to about 254° C. This cooled fuel-air mixture, even during the reactions within the second sub-reactor 608b, increases in temperature to about 588° C. After exiting the second sub-reactor 608b, the fuel-air mixture passes through the heat exchanger 610 again, and is cooled to about 194° C. The process continues through the third and fourth sub-reactors 608c-d, with temperatures maintained at levels to ensure efficient reactions and mitigation (or elimination) of damage to the sub-reactors 608a-d.

A similar process of fuel injection to control an air-to-fuel ratio (A/F) and fuel-air mixture temperatures is shown in FIG. 7 and inerting system 700. As noted above, the inerting system 700 of FIG. 7 includes six sub-reactors 708a-f, each arranged with a respective fuel injector to inject additional fuel into the system prior to, or at, the sub-reactors 708a-f. A similar reduction in oxygen content is achieved, but as shown, the operating temperatures are lower within the inerting system 700 of FIG. 7 as compared to the inerting system 600 of FIG. 6.

Advantageously, embodiments provided herein enable efficient and safe generation of inert gas for fuel tanks. This is achieved through a staged or series of fuel injections with intermediate cooling between separate catalytic reactions. By managing the temperature within the catalytic reactor, potential damage to the catalyst can be minimized and/or prevented. Lower operating temperatures also affect the choice of materials of construction for the oxidizer, with lower temperatures enabling lighter and/or more efficient materials to be employed with the catalytic reactor. In addition, lower temperatures reduce the risk of operating an oxidizer near fuel, particularly if the system can operate below the autoignition temperature of the fuel. Staged fuel injection, as provided herein, allows the whole system to operate below the lower flammability limit concentration of the fuel.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fuel tank inerting system, comprising
a fuel tank;
an air source arranged to supply air into a reactive flow path;
a catalytic reactor comprising a plurality of sub-reactors arranged in series along the reactive flow path, the plurality of sub-reactors comprising a first sub-reactor and a second sub-reactor;
a heat exchanger arranged along the reactive flow path, wherein at least a portion of the heat exchanger is arranged between the first sub-reactor and the second sub-reactor along the reactive flow path;
at least one fuel injector arranged relative to at least one sub-reactor of the plurality of sub-reactors, the at least one fuel injector configured to inject fuel into the reactive flow path at at least one of upstream of and in the respective at least one sub-reactor to generate a fuel-air mixture; and
a fuel tank ullage supply line fluidly connecting the reactive flow path to the fuel tank to supply an inert gas to a ullage of the fuel tank.

2. The fuel tank inerting system of claim 1, wherein the at least one fuel injector comprises a plurality of fuel injectors arranged along the reactive flow path.

3. The fuel tank inerting system of claim 1, wherein the at least one fuel injector is a passive flow control to meter injection of the fuel into the reactive flow path.

4. The fuel tank inerting system of claim 3, wherein the at least one fuel injector is a valve and wherein a fluid pressure of the fuel determines a fuel injection rate.

5. The fuel tank inerting system of claim 1, wherein the at least one fuel injector is an active flow control to meter injection of the fuel into the reactive flow path, wherein a controller controls operation of the at least one fuel injector.

6. The fuel tank inerting system of claim 5, wherein the at least one fuel injector is at least one of electrically controlled, electronically controlled, and mechanically controlled.

7. The fuel tank inerting system of claim 1, further comprising a supplemental fuel line fluidly connecting the fuel tank to the at least one fuel injector.

8. The fuel tank inerting system of claim 1, wherein a number of fuel injectors is equal to the number of sub-reactors of the plurality of sub-reactors.

9. The fuel tank inerting system of claim 1, wherein as the heat exchanger comprises a plurality of cells, wherein each cell of the heat exchanger is positioned between two sub-reactors with the reactive flow path passing through the cells to cool the fuel-air mixture.

10. The fuel tank inerting system of claim 1, wherein the plurality of sub-reactors comprises at least four sub-reactors.

11. The fuel tank inerting system of claim 10, wherein the plurality of sub-reactors comprises at least six sub-reactors.

12. The fuel tank inerting system of claim 1, wherein the fuel tank is a fuel tank of an aircraft, and a cooling air within the heat exchanger is sourced from a ram inlet of the aircraft.

13. An aircraft comprising:
a fuel tank;
an air source arranged to supply air into a reactive flow path;
a catalytic reactor comprising a plurality of sub-reactors arranged in series along the reactive flow path, the plurality of sub-reactors comprising a first sub-reactor and a second sub-reactor;
a heat exchanger arranged along the reactive flow path, wherein at least a portion of the heat exchanger is arranged between the first sub-reactor and the second sub-reactor along the reactive flow path;
at least one fuel injector arranged relative to at least one sub-reactor of the plurality of sub-reactors, the at least one fuel injector configured to inject fuel into the reactive flow path at at least one of upstream of and in the respective at least one sub-reactor to generate a fuel-air mixture; and
a fuel tank ullage supply line fluidly connecting the reactive flow path to the fuel tank to supply an inert gas to a ullage of the fuel tank.

14. The aircraft of claim 13, wherein the at least one fuel injector comprises a plurality of fuel injectors arranged along the reactive flow path.

15. The aircraft of claim 13, wherein the at least one fuel injector is a passive flow control to meter injection of the fuel into the reactive flow path.

16. The aircraft of claim 13, wherein the at least one fuel injector is an active flow control to meter injection of the fuel into the reactive flow path, wherein a controller controls operation of the at least one fuel injector.

17. The aircraft of claim 13, further comprising a supplemental fuel line fluidly connecting the fuel tank to the at least one fuel injector.

18. The aircraft of claim 13, wherein as the heat exchanger comprises a plurality of cells, wherein each cell of the heat exchanger is positioned between two sub-reactors with the reactive flow path passing through the cells to cool the fuel-air mixture.

19. The aircraft of claim 13, wherein the plurality of sub-reactors comprises at least four sub-reactors.

20. The aircraft of claim 19, wherein the plurality of sub-reactors comprises at least six sub-reactors.

* * * * *